TWO-WAY TELEVISION OVER TELEPHONE LINES

Filed July 26, 1956 3 Sheets-Sheet 1

INVENTOR
F. K. BECKER
BY Harry C. Hart
ATTORNEY

Oct. 20, 1959 F. K. BECKER 2,909,600

TWO-WAY TELEVISION OVER TELEPHONE LINES

Filed July 26, 1956 3 Sheets-Sheet 2

INVENTOR
F. K. BECKER
BY Harry C. Hart
ATTORNEY

Oct. 20, 1959 F. K. BECKER 2,909,600

TWO-WAY TELEVISION OVER TELEPHONE LINES

Filed July 26, 1956 3 Sheets-Sheet 3

INVENTOR
F. K. BECKER
BY Harry C. Hart
ATTORNEY 2,909,600
Patented Oct. 20, 1959

2,909,600

TWO-WAY TELEVISION OVER TELEPHONE LINES

Floyd K. Becker, Summit, N.J., assignor to Bell Telephone Laboratories, Incorporated, New York, N.Y., a corporation of New York Application July 26, 1956, Serial No. 600,244
6 Claims. (Cl. 178—6.8)

This invention relates to two-way communication service and has for its principal object to provide each subscribing party to such service with simultaneous audible and visual impressions originating with the other party. A related object is to provide such two-way sight and sound communication with but modest demands on the frequency bandwidth of the transmission medium.

A copending application of W. E. Kock and R. L. Miller, Serial No. 459,300, filed September 30, 1954, and now matured into Patent No. 2,895,005 granted July 14, 1959, deals with such a system. It provides each telephone subscriber, in addition to his telephone set which may be conventional, with a scene pickup device, e.g., a miniature camera tube, and an image forming device, e.g., a miniature picture reproducing tube. These devices are preferably mounted close together and on axes which converge at an intersection point somewhat beyond the distance (10 inches, approximately, for the unaided eye) of most distinct vision, measured from their faces; i.e., at a distance of 20–40 inches. The camera tube generates image signals of whatever scene is within its field of view, in the customary way, and at a rate of, for example, 20 frames per second. A single one of these frames, for example the twentieth, is stored on a record, e.g., a magnetizable tape, the remaining nineteen being discarded. This record is scanned at slow speed, to produce modified image signals, compressed on the frequency scale and expanded on the time scale by a factor of 20:1. The modified signals are transmitted over a standard telephone channel, whose bandwith is sufficient for the purpose, to a receiver station, where they are recorded at the relatively slow rate at which they arrive. The resulting record is now scanned twenty times in succession and at a high speed: higher, in the ratio of 20:1 than the recording speed, to recover an image signal representing the one undiscarded frame, and restored to its original dimensions in frequency and time. This image signal is applied twenty successive times to the receiving subscriber's reproducer tube to produce on its face twenty successive repetitions of the undiscarded frame. At the end of one second, these operations are repeated for the fortieth frame, the intervening ones being discarded as before, and so on. The receiving subscriber is thus presented with a sequence of physically still pictures, each of which endures for one second and then gives place abruptly to the next. The impression made on the receiving subscriber is one of flickerless, undelayed picture transmission which is concurrent with, and supplements, his voice transmission, while the picture rate of change is such as to create the illusion of almost continuous change in the scene being viewed.

With such a system it is possible ot reproduce, for each party to a telephone conversation, an image of the other party that is of acceptable quality and a few square inches in area, and to transmit the image signals required for such reproduction over a standard telephone channel of 4000 cycles per second bandwidth.

A copending application of F. K. Becker, Serial No. 506,235, filed May 5, 1955, and now matured into Patent No. 2,878,310, granted March 17, 1959, substitutes for the magnetizable tape of the Kock-Miller application a magnetizable drum which rotates at constant speed. For the slow speed pickoff from the tape, it substitutes apparatus and a procedure for deriving brief samples of nonadjacent elements of the record on the drum.

In an application of M. A. Clark, R. L. Miller and R. W. Sears, Serial No. 525,927, filed August 2, 1955, the system is instrumented in another fashion. The photosensitive screen of a television pickup device is briefly exposed to the scene to be transmitted at each of a succession of regularly recurrent instants. For example, the exposure may be made once per second and each exposure may endure for one-thirtieth second. The time of each exposure and the intervals between successive exposures may be controlled by a mechanical shutter or by the application of potentials of appropriate magnitude and polarity to a barrier grid.

Each of these brief exposures results in the storage of an electrostatic image of the scene on the photosensitive screen of the pickup device. This image is now converted into a vision signal by causing an electron beam to scan it in the customary fashion, but at a speed and at a rate that are much slower than is customary in the television art, i.e., thirty frames per second. Thus the speed with which the beam sweeps the image is reduced to such a point that the entire scanning operation requires a full second. As a result the vision signals derived by the scanning process are expanded on the time scale and compressed on the frequency scale by a factor equal to the ratio of the duration of the scanning process to its normal duration; e.g., by a factor of 30:1.

As a practical matter the slow scanning speeds of this system present problems in the construction of the coils and associated circuits which control the deflection of the cathode beam, magnetic deflection being greatly preferred for camera tubes to electrostatic deflection. In order to utilize camera tubes and associated circuits as presently available in the open market it is desirable, if possible, to retain the operating speeds for which such apparatus is designed and still to derive from such apparatus a slow speed image signal suitable for transmission over a narrow band medium such as a standard telephone line.

In accordance with the present invention this is accomplished in the following fashion: the scanning operation of the camera tube is conducted at normal rates; e.g., the cathode beam, actual or virtual, accomplishes 40 complete line-for-line scans in one second. However, the tube is disabled from deriving from such scans any image signal except during a single brief interval, or at most a few such brief intervals, on each scanning line. One way in which this may be accomplished is to enable the scanning beam itself for each such brief interval, leaving it disabled for the balance of each line scan. As a result, a brief sample is derived of the light value of that part of the image which is instantaneously struck by the beam. In the preferred form of the invention only one such sample is derived for each line scan, and the samples for the several scanning lines of each full area scan or frame are displaced laterally from those for the prior frame. For example, with sixty-three scanning lines each having 40 distinguishable picture elements, the image is fully scanned 40 times. Sixty-three samples are taken, one on each of the sixty-three lines, lying one above the other in a column close to the left-hand margin of the image. On the second scan sixty-three more samples are taken lying one above the other and slightly displaced horizontally from the picture elements sampled during the first scan and so on until, on the fortieth scan, the sixty-three elements sampled are those which lie close to the righthand margin of the image. Thereupon the cycle is repeated.

A convenient way in which to cause the column of sampled signal elements thus to drift or creep from one margin of the image to the other is to provide a sampling control frequency which is slightly greater or less than the line scanning frequency. This in turn may be accomplished by the introduction of a continuous slow phase rotation of the one with respect to the other.

With ideal screen materials each exposure of the photosensitive screen not only forms a new electrostatic image of the scene but erases the prior image. As a practical matter, however, such erasure by exposure is imperfect. In accordance with another aspect of the invention, erasure of each image before exposure to the following image is assured by carrying out one complete scan, just prior to each exposure, with the beam turned on to its full strength. This brings all the elementary condensers of which the photosensitive screen is formed to the same potentials and thus completes the erasure of any residual charge differences between them.

The electrostatic image formed on the photosensitive screen by exposure to the scene inevitably decays with the passage of time. While materials are available for which the decay that takes place during one second of time are insignificant it may be desired to employ materials which decay more rapidly. Decay of the electrostatic image during the period through which it is scanned results in distortion in the resulting vision signal. This distortion may be compensated, in accordance with the invention, by the employment of a variable gain vision signal amplifier and by increasing its gain gradually, and selectively with frequency, from beginning to end of each scan. The control signal which governs this gain increase may conveniently be derived from the timing wave source which controls the shutter.

The resulting narrow band vision signals are transmitted to a receiver station where they actuate the writing beam of a display tube of the storage type, while this beam scans the tube screen in space quadrature with the scanning operation at the transmitter station: e.g., along vertical lines that are successively displaced in the horizontal direction until a full frame scan has been completed. This operation, which occupies the entire period between exposures of the camera tube screen converts the incoming image signal, derived from a single exposure of the camera tube to the scene, into an electrostatic charge image on the tube storage screen. The conversion occupies the full time between successive exposures of the camera tube to the scene. The display tube is provided, in addition, with a flood beam gun and a luminescent screen so arranged that when the storage screen, bearing its charge image, is flooded with electrons of the flood beam, a visible image appears on the luminescent screen. All parts of this image appear simultaneously and without resort to any secondary scanning process.

A second similar display tube is provided, and the narrow band vision signals derived from the next exposure of the camera tube to the scene are similarly recorded as a charge image on its storage screen. When a charge image has thus been completely stored it is converted into a visible image as before. Switching means are provided to operate the two display tubes in alternation, each one recording the incoming vision signal, derived from the most recent exposure of the camera tube to the scene, on its storage screen while the other one displays the visible image of the scene derived from the prior exposure. Optical means such as a half transparent mirror are provided to secure space registration of the visible images which are thus caused to appear in succession on the faces of the two display tubes.

As an alternative, a special tube may be employed having two storage screens, two luminescent screens, a writing beam gun and a flood beam gun or a pair of flood beam guns. The writing beam gun acts to store the image derived from each exposure on one storage screen while the flood beam gun converts the image derived from the prior exposure, and already stored on the second storage screen, into a visible image. Switching means are provided to direct each beam toward one screen while the other beam is directed toward the other screen. Means are also provided for switching the potential of the screen or screen grid so that the writing beam does not generate a visible image and thus interfere with the desired viewing process.

In an ordinary telephone conversation, each party may at any time if he wishes, hear without being heard, as when he wishes to speak to a visitor, merely covering his telephone transmitter with his hand to prevent his voice waves from striking its diaphragm. The present system provides a visual counterpart to this operation, enabling one subscriber to see a picture of the other without himself being seen. This is accomplished by the relative disposition of the pickup device and the reproducer device and by the provision that the subscriber may either view the received picture as it appears on the face of the reproducer tube squarely, in which event his face is within the field of the camera tube, or he may view it obliquely, in which case his face is concealed from the camera tube. A suitably located view finder or eye-guide, e.g., a mirror in which each subscriber can see his own reflection, enables him to place himself as he wishes with respect to the pickup device.

The invention will be fully apprehended from the following detailed description of a preferred illustrative embodiment thereof taken in connection with the appended drawings in which.

Figure 1:
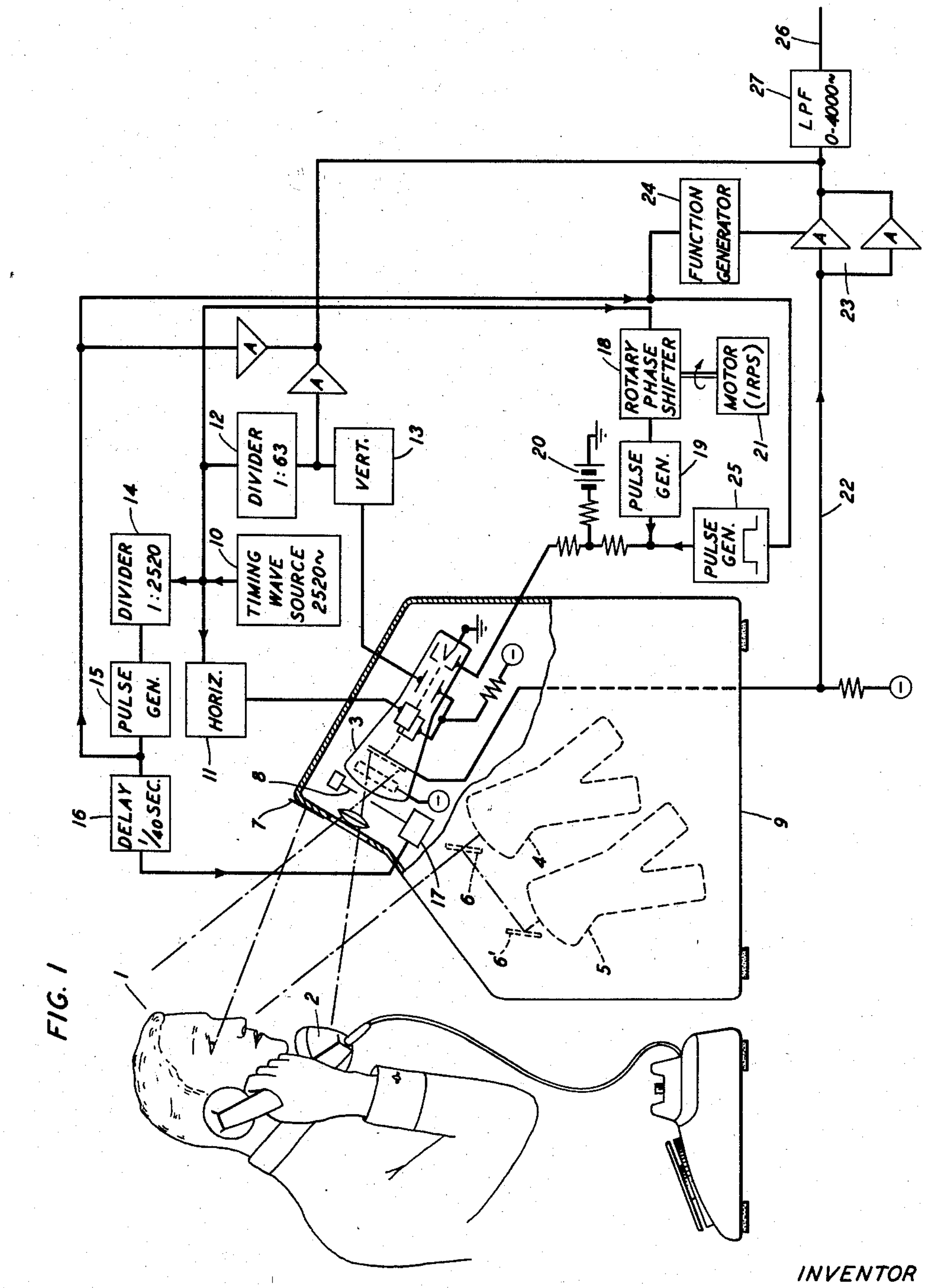
Fig. 1 is a schematic circuit diagram showing transmitter station apparatus in accordance with the invention.
Figure 2:
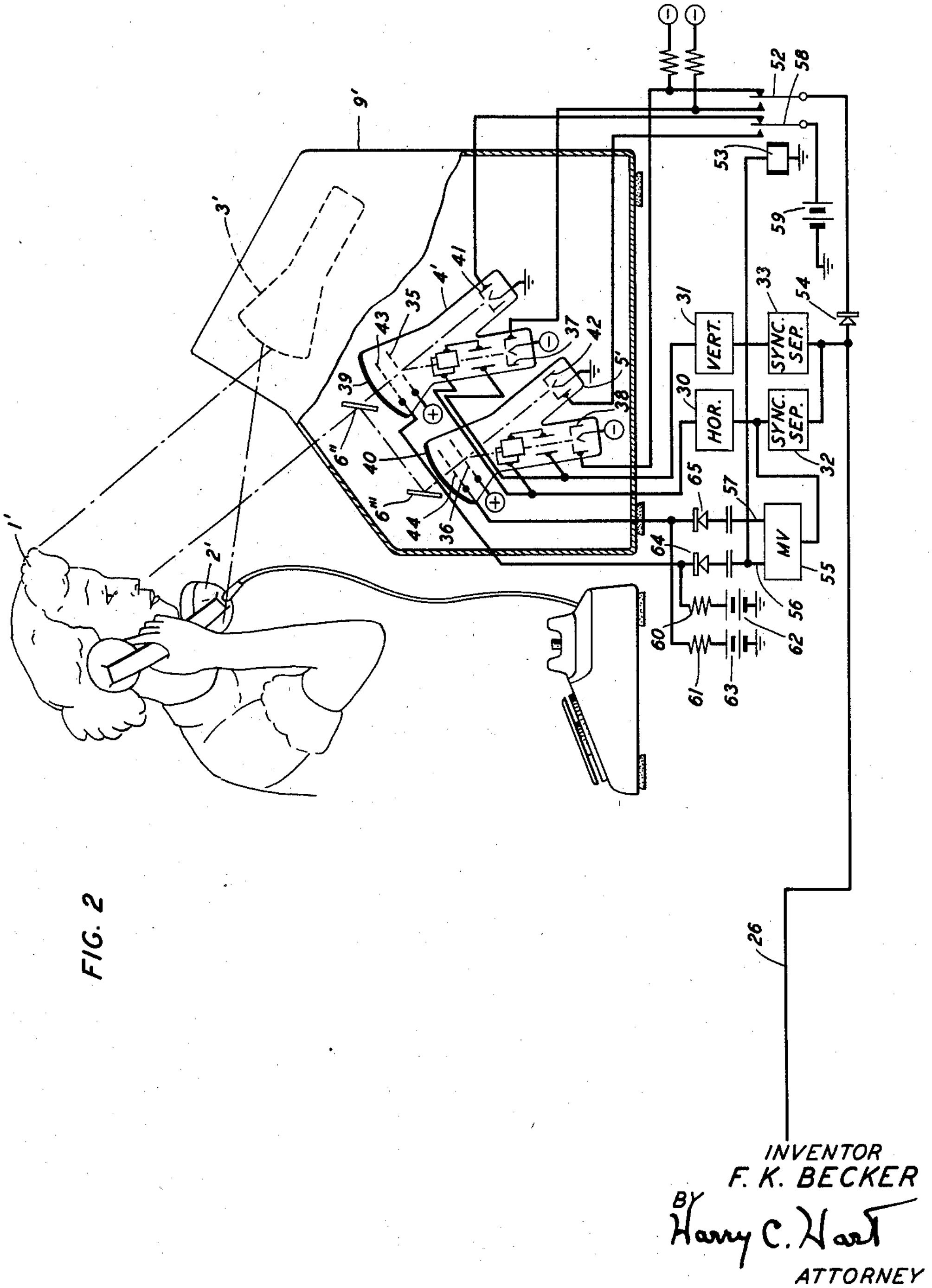
Fig. 2 is a schematic circuit diagram showing receiver station apparatus suitable for use with the invention.

Referring now to the drawings, Fig. 1 and Fig. 2 together show, in block schematic form, a complete system embodying the invention. A West subscriber 1 and an East subscriber 1' are shown engaged in two-way sight and sound communication. While in practice each of them is to be provided with transmitting apparatus and receiving apparatus, the drawings show the West subscriber's transmitting apparatus and the East subscriber's receiving apparatus. Duplication of the receiver apparatus in the West substation and of the transmitter apparatus at the East substation presents no problem, but to show such duplication would tend unduly to complicate the drawing.

Each subscriber is provided with a conventional telephone set 2, 2', including a transmitter and a receiver. Associated telephone apparatus and lines, which may be conventional, are not shown. In the description to follow, receiver apparatus elements shown at the East station, that are the same as the West station sending apparatus elements, are denoted by like reference characters, distinguished by primes.

Each subscriber is provided, further, with a supplementary vision signal set which may comprise a miniature camera tube 3, a pair of miniature reproducer tubes 4, 5, of the storage type, a half-transparent mirror 6 and a fully reflecting mirror 6', together with a shutter 8 for exposing the camera tube 3 to the scene and associated apparatus for controlling the intensity and the vertical and horizontal sweeps of the cathode beams of these tubes and for holding the operation of the shutter 8 in synchronism with the sweeping of the beams. The tubes 3, 4, 5 may be mounted in a cabinet 9 having a front face of convenient shape, and they are preferably mounted therein with the mirror 6 spaced not more than a few inches away from the face of one of the reproducer tubes and with the axes of the tubes 3, 4 at angles to each other which intersect at the distance of greatest subscriber convenience, which is normally about two to four times the distance of the most distinct vision. The camera tube 3 is of the image storage type, e.g., one of the types which are sold in the market under the name "Iconoscope," "Videcon," "Image Orthicon," or the like. The reproducer tubes 4, 5 are likewise of the storage type, e.g., the type sold in the market under the name "Iatron." Many alternatives for camera tubes and reproducer tubes are described in "Television" by Zworkin and Morton (Wiley 1954).

A mirror 7 is conveniently located on the face of the cabinet 9 and so disposed that when the subscriber 1 can see his own reflection in this mirror the camera tube 3 can "see" him, and not otherwise.

Operations are controlled by a basic timing wave source 10 which delivers a control signal of 2520 cycles per second. This controls a horizontal sweep generator 11 which furnishes a saw tooth voltage to the horizontal deflection elements of the camera tube 3, thus to cause the beam of this tube to execute 2520 horizontal sweeps per second. The frequency of the output of the oscillator 10 is reduced by a divider 12 in the ratio of 63:1 to produce a control signal of 40 cycles per second. This controls a vertical sweep generator 13 which applies a saw tooth signal to the vertical deflection elements of the tube 3, thus to cause the cathode beam to execute 40 vertical sweeps per second.

With this arrangement the cathode beam of the camera tube 3 executes forty complete scans of its storage screen in each second, each scan comprising sixty-three lateral sweeps.

The output of the timing wave source 10 is also reduced by another divider 14 in the ratio 2520:1, thus to produce a control signal of one cycle per second. A pulse generator 15 converts this low frequency signal into a pulse train which is passed by way of a delay device 16 to a control mechanism 17 which opens the shutter 8 to expose the photosensitive screen of the camera tube 3 to the scene to be transmitted at a rate of one exposure per second and for a brief interval such as $\frac{1}{30}$ second.

The output of the pulse timing wave source 10 is applied by way of a rotary phase shifter 18 to another pulse generator 19 which delivers brief positive pulses to the control electrode of the electron gun of the camera tube 3. In the absence of such pulses this electrode is held below cutoff as by a battery 20 whose positive terminal is grounded. A motor 21 drives the rotor of the phase shifter 18 at the rate of one revolution per second, thus progressively to shift the phase of the output of this unit with respect to its input and so, in effect, to convert the control signal of 2520 cycles into a pulse train 2519 cycles per second. Thus the cathode beam is pulsed into the On condition at a rate very slightly less than the horizontal line scanning rate of the camera tube 3 so that the pulses occur once for each scanning line but at points of the storage screen which are progressively displaced from each other in a lateral direction.

The foregoing operations give rise on the output conductor 22 of the camera tube 3 to a sequence of samples of the image stored on its screen by the most recent exposure to the scene by the shutter 8. As compared with the signal which would appear on the output conductor 22 in the absence of the sampling process, this sample train is a slow speed narrow band signal, suitable for transmission over a telephone line of standard bandwidth.

To compensate for any decay of the image stored on the photosensitive screen of the camera tube 3 during the time required for a single complete scan, this vision signal may be passed through a variable gain vision signal amplifier 23 the gain of which is gradually increased from beginning to end of the scan. The control signal which governs this gain increase may conveniently be generated by a function generator 24 under control of the basic timing source and may be applied to the gain control terminal of the amplifier at any desired signal level.

As a refinement, crispening may be introduced by constructing the amplifier 23 of two component amplifiers of which the lower one may have a normal frequency characteristic over the range of interest while the upper one, controlled by the function generator 24, may be designed to accentuate desired high frequency components as compared with low frequency components.

With a conventional scanning procedure the traverse of the image on the camera tube 3 by its cathode beam automatically erases the image progressively as the beam advances. With the present system, minute imperfections of registration might cause the beam, at one sampling instant, to overlap an area earlier sampled and thus partly erase it. Accordingly, in the present system automatic erasure is not relied on. Rather, provision is made for the full erasure of each image immediately prior to the next exposure, and the potentials of the electron optical system of the camera tube 3 are adjusted to minimize automatic erasure; i.e., in a fashion tending to produce nondestructive read-out. The erasure is accomplished by the application of a positive pulse of $\frac{1}{40}$ second duration to the control electrode of the camera tube 3, and of an amplitude to overpower the negative potential source 20 and to mask the sampling pulses derived as above described through the pulse generator 19. This erasing pulse is conveniently generated by a pulse generator 25 under control of the output of the first pulse generator 15. Its instants of occurrence are located on the time scale immediately prior to the openings of the shutter 8 by the interposition of a delay of $\frac{1}{40}$ second, as by the delay device 16, in the path from the pulse generator 15 to the shutter control mechanism 17.

To the narrow band vision signal thus produced, synchronizing signals are added for control of the receiver apparatus. The desired synchronizing signals are, first, a frame synchronizing signal of one cycle per second derived from the pulse generator 15, and, second, a line synchronizing signal of forty cycles per second derived from the frequency divider 12. These two signals are passed through buffer amplifiers and combined with the vision signal to produce a composite outgoing signal on the output conductor 26. Undesired high frequency components due solely to the sampling process are eliminated prior to transmission by a filter 27.

In the system as thus far described the pulsing of the cathode beam operates directly to take samples of an electrostatic image which is fixed on the storage screen of the camera tube. As with ordinary photography a fixed image may be formed of a moving scene by a brief exposure or "snapshot." In the special case in which the scene contains no moving objects as, for example, where it comprises a document, the image is fixed by the very nature of the scene itself and the shutter may be dispensed with. In the language of photography, a time exposure suffices to create a fixed image.

However the image be fixed, the control electrode of the camera tube is not the only point to which the sampling pulses may be applied, though in the case of Videcon tube it is the most convenient one. Depending on the construction and mode of operation of the camera tube selected it may be preferred to apply the sampling pulses to a target electrode, to a secondary electron collector electrode or the like.

Furthermore, it is of no importance from the standpoint of the signal finally transmitted whether it be derived by directly sampling the image on the screen or, more indirectly, by applying the sampling pulses to a sampling gate connected in tandem in the video signal path. Indeed, especially in the case of the transmission of an image signal derived from a document or other still scene, it may be preferred to carry out the sampling operation in this indirect fashion.

Figure 3:
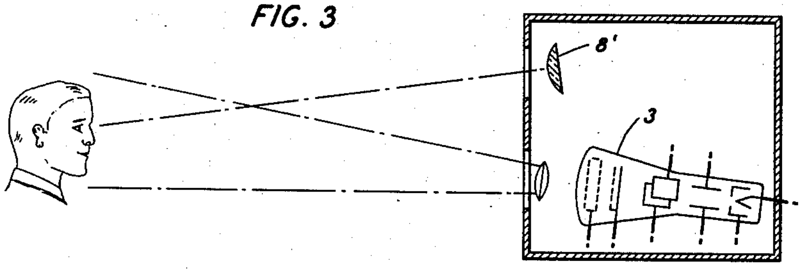
Figs. 3–7 are schematic representations of view finders of various forms which may be employed in the use of the invention.

The view finder which enables each calling party so to locate himself as to be seen by the other calling party or not seen by him, as he prefers, is illustrated in Fig. 1 by a simple plane mirror 7. As shown in Fig. 3 the mirror 8' is preferably of convex figure, the convexity being so selected that it embraces the same field of view as does the camera tube.

Figure 4:
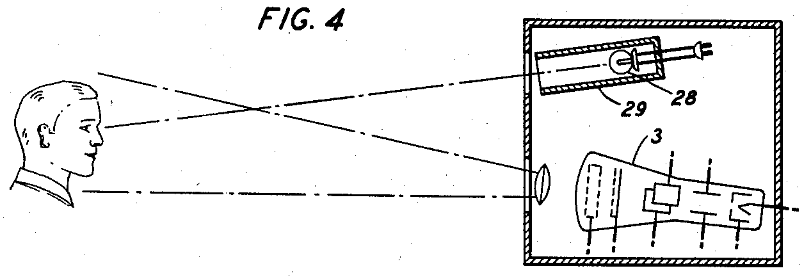
Figure 5:
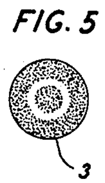

The view finder may take many other forms. In Fig. 4 it comprises a light 28 mounted at the closed end of a cylindrical tube 29 whose other end is open facing the subscriber. The length and diameter of the tube may readily be proportioned in such a fashion that when the subscriber can see the light through the open end of the tube he is within the field of view of the camera tube and when the tube wall conceals the light from him he is outside of the field of view of the camera tube. As a refinement, the light itself may take the form of an illuminated ring mounted in the base of the tube. The structure of this illuminated ring may conveniently comprise a light mounted behind a mask having an annular opening. This arrangement, shown in Fig. 5 furnishes the result mentioned above and, in addition, enables the calling party to ensure that his eye, at least, is centered in the field of view of the camera. Thus, when he sees the illuminated ring in its entirety he is centered; when he sees it partially eclipsed he is off center; and when the illuminated ring is entirely obscured he is out of the field of view of the camera.

Figure 6:
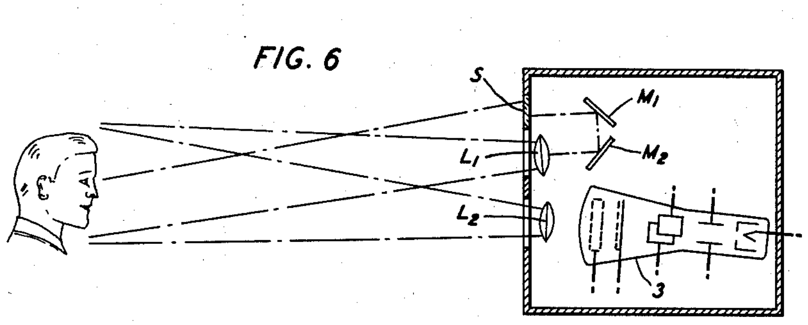

Fig. 6 shows an alternative in which the mirror of Fig. 3 is replaced by a convex lens $L_1$, a pair of supplementary beam-reversing mirrors $M_1$, $M_2$ and a screen S for supporting a real image; e.g., a screen of ground glass. The manner of its operation is self-evident.

Figure 7:
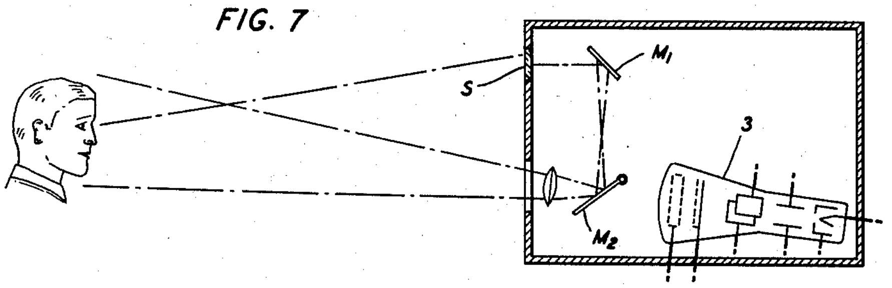

In Fig. 7 a single lens does double duty both to project the image of the subscriber onto the screen of the camera tube 3 and as a view finder. Of the two beam-reversing mirrors the lower one $M_2$ may be of the half-transparent variety which transmits light to the tube as well as reflecting it by way of the upper supplementary mirror $M_1$ to the ground glass screens. If preferred, the mirror $M_2$ may be fully reflecting, in which case it must be withdrawn from the light path to the face of the camera tube for each exposure. It is indicated as being pivoted for this purpose and may therefore serve as the shutter 8 of Fig. 1.

Many modifications of the foregoing arrangements are equally possible.

That the modified vision signal occupies no more bandwidth than that of a standard telephone channel will be plain upon recognition that a picture comprising sixty-three lines, each having forty picture elements, or a total of 2520 picture elements, compares favorably, in respect to its quality and detail, with a half-tone reproduction in a magazine or a newspaper, provided only that it be restricted in size. Thus if 2520 picture elements are distributed over a picture whose dimensions are 1⅛ inch by ⅞ inch, the picture elements are not individually visible to the unaided eye. By spreading the transmission of these picture elements of a single frame over the entire period of a single second of time the desired transmission can in principle be carried out within a band of 1260 cycles per second. Thus the provision of a conventional standard telephone channel of 4000 cycles per second bandwidth, whose phase and amplitude characteristics are suitable at least over the central 2000 cycle part of its band, is ample for a one inch square picture; indeed, it provides a margin of safety.

The entire vision signal, modified in the fashion described above, is now transmitted over a conventional telephone channel 26 to an East station for display to an East subscriber. The East subscriber 1' is provided with a conventional telephone instrument 2', a cabinet 9' containing a camera tube 3', a pair of display tubes 4', 5', a half-transparent mirror 6'' and a fully reflecting mirror 6'' through which to view the images on the faces of tubes 4' and 5'. These tubes are supplied with vertical and horizontal beam sweep waves by generators 30, 31 which are locked in step with the transmitted horizontal and vertical synchronizing pulses by synchronizing pulse separators 32, 33. Each of these display tubes 4', 5' is provided with a perforated storage screen 43, 44, a first electron gun 37, 38 for projecting a pencil-like writing beam on the screen 43 or 44, a luminescent screen 39, 40 and a second electron gun 41, 42 for flooding the storage screen 43 or 44 with electrons.

The incoming signal, arriving on the line 26, is a narrow band vision signal like that delivered at the West station to the modulator 22 and containing horizontal and vertical synchronizing pulses. The synchronizing pulses are separated by pulse separators 32, 33 and are applied to a horizontal sweep generator 30 and to a vertical sweep generator 31 to actuate the former at one cycle per second and the latter at forty cycles per second. These generators deliver saw tooth waves to the horizontal and vertical deflecting elements of the tubes 4', 5' in well known fashion, but at rates which are much slower than those which are customary in commercial television practice: the sweep directions, moreover are in space quadrature with those employed for the camera tube 3.

The incoming vision signal is applied to one moving contact 52 of a relay 53 whose front and back fixed contacts are connected respectively to the control grids of the writing beam guns 37, 38 of the two tubes 4', 5'. Synchronizing pulses, which are normally of opposite polarity from the vision signals, may be prevented from reaching the contact 52 by a rectifier 54.

Each of the horizontal synchronizing pulses, which recur once per second, is applied by way of the horizontal synchronizing pulse separator 32 to a bistable device such as a multivibrator 55 which, characteristically, has two output terminals 56, 57 and two stable states, the potential of one output terminal shifting from one state to the other each time a pulse is applied to its input terminal, while the potential of the other output terminal shifts at the same instants but in the opposite sense.

One output terminal 56 of this multivibrator is connected to the winding of the relay 53 which actuates the moving contact 52. The sensitivity and the bias, not shown, of this relay 53 are to be so adjusted that for one stable state of the multivibrator 55 the moving contact 52 is drawn against the front fixed contact while for the other stable state it rests against the back fixed contact.

The same relay 53 is provided with another moving contact 58, and another pair of fixed contacts. The moving contact 58 is connected by way of a battery 59 to ground while the front and back fixed contacts are connected, respectively, to the control grids of the flood beam guns 41, 42 of the two tubes 4', 5'. It is important that the connections be so made that when the moving contacts 52, 58 rest against the back contacts in the position shown, the incoming vision signal is applied to the control grid of the writing beam gun 38 of one tube 5' while the potential of the battery 59 is applied to the control grid of the flood beam gun 41 of the other tube, 5', and that when the moving contacts are drawn up against the front fixed contacts of the relay 53 the energization conditions of the two tubes 4', 5' are interchanged.

The vision signal derived from a single particular exposure of the camera tube 3 to the scene, and from which synchronizing pulses have been removed by the rectifier 54, is thus applied to modulate the strength of the writing beam of one of the tubes, for example the left-hand tube 5'. As it does so this beam is caused by the sweep voltages derived from the generators 30, 31 to scan the area of the storage screen 44 and so to build up on this screen an electrostatic charge image of the scene 1' to which the West station camera tube 3 was first exposed. This scanning operation occupies an entire second of time. At the conclusion of this second the potential condition on the first output terminal 56 of the multivibrator 55 is shifted, the relay 53 is actuated, and the moving contacts 52, 58 are drawn against their front fixed contacts. Accordingly, the vision signal corresponding to the following exposure of the camera tube 3 is applied to modulate the writing beam of the other tube 4', while the writing beam of the first tube 5' is disabled by removal of actauting signals from its control element 38. The writing beam of the tube 4' thus scans the storage screen 43 of the tube 4' in the fashion described above for the first exposure and the first tube 5', thereby to build up on the storage screen 43 an electrostatic image of the scene is impressed on the camera tube 3 by the second exposure, occupying an entire second of time to do so. At the commencement of this scanning operation the moving contact 58 of the relay 53 is also drawn against its front fixed contact, thereby to apply a positive accelerating voltage from the battery 59 to the control element of the flood beam gun 42 of the first tube 5'. The storage screen 44 of the first tube is thus flooded with electrons from its flood beam gun.

Accordingly, the flood beam passes through the various perforations of the storage screen 44 and impinges on the luminescent screen 40 in amounts dependent on the electrostatic charge localized in the immediate vicinity of each such perforation and impressed thereon by the writing beam. This action converts the electrostatic image stored on the screen into a visible image on the luminescent screen 40 which persists until it is erased. Thus the East subscriber 1', viewing the face of the first tube 5', sees a persistent visible image derived at the transmitter station from a single brief exposure of the camera tube 3 to the scene 1.

This image persists as long as the moving contact 58 of the relay engages the front fixed contacts, namely for a full second of time. When this second has elapsed the potential condition of the multivibrator 55 is reversed, the relay 53 is deenergized, the moving contacts 52, 58 return to engage the fixed back contacts, the flood beam of the tube 5' and the writing beam of the tube 4' are disabled, while the flood beam of the tube 4' and the writing beam of the tube 5' are once more enabled. Enabling of the flood beam of the tube 4' operates in the fashion described above to transfer to the luminescent screen 39 of the tube 4' a visible counterpart of the electrostatic image on the storage screen 43 of the tube 4' which was placed there by the scanning of the storage screen 43 by the writing beam, modulated by vision signals corresponding to the second exposure of the camera tube 3 at the West station to the scene. The tube 5' is now in readiness to carry out the storage of an electrostatic charge image of the third exposure.

The visible images which appear on the luminescent screens 39, 40 of the two tubes 4', 5' in alternation for successive exposures of the camera tube to the scene may be brought into space registration or superposed in any desired fashion. For the sake of illustration a half-transparent mirror 6'' and a fully reflecting mirror 6''' are disposed in such positions relatively to the faces of these tubes that the East station subscriber 1' may view the face of one tube 4' by transmitted light and the face of the other tube 5' by reflected light. When this simple means for image registration is employed it is advantageous that no image shall coincide in time with its predecessor image; i.e., that whichever tube is displaying a visible image, the face of the other tube shall be dark. This is automatically accomplished in accordance with the invention since only the one flood beam of the display tube which is being viewed is actuated at a time.

As the last complete scene becomes available for viewing it is placed in service as explained above. The previously stored exposure is now no longer needed and may accordingly be erased to make the area available for storing still later vision signals. To accomplish this an erasing period is provided just prior to the moment at which the writing of the electrostatic image for the following exposure is commenced. To this end the appropriate one of the storage screens 43, 44 is connected by way of a resistor 60, 61 and a positive potential source 62, 63 to ground and is supplied with an erasing pulse once for each full cycle of the operation of the tubes, i.e., once in two seconds, and at the instant of the commencement of the storage operation. To this end each of the two output terminals of the multivibrator 55 is connected by way of a condenser to one of the storage screens. The condenser acts in combination with the load resistor 60 or 61 to form the derivative of the multivibrator output; i.e., to produce a positive-going pulse at the instant of potential rise and a negative-going pulse at the instant of potential fall. Negative-going pulses may be eliminated in any desired fashion, e.g., by the interposition of rectifiers 64, 65. The positive-going pulse applied to the storage screen 43 or 44 acts to discharge it whereupon the previous information on the screen is erased. With this arrangement, regular alternation of the erasing pulses as between the two display tubes 4', 5' is assured.

While the East station apparatus has been illustrated as comprising two separate display tubes, each complete with a writing gun, a flood gun, a storage screen, an erasing screen and a luminescent screen, it is obvious that all of these elements could be included within a single envelope, the storage screens and the luminescent screen being mounted side by side and close together. This simplifies the registration or superposition in space of their images by optical means. Moreover, it is evident that this construction can be still further simplified by the use of a single writing beam and a single flood beam, one being directed toward one storage screen while the other is directed toward the other storage screen, and each being continuously energized. Modifications of the switching circuits described above to control the beams of such a tube will suggest themselves to those skilled in the art.

The receiver and reproducer apparatus hereinabove described forms a part of the subject matter of the aforementioned application of M. A. Clark, R. L. Miller and R. W. Sears. It is to be noted, however, that in the present system a wide disparity holds between the scanning speeds of the transmitter and those of the receiver. In particular the camera tube beam scans 2520 horizontal lines per second and forty frames per second while the reproducer tube beam scans forty vertical lines per second and one frame per second. The reproducer apparatus is maintained in synchronism with the transmitter apparatus by virtue of a scanning conversion from horizontal to vertical. Thus, the output of the divider unit 12 at the transmitter station, which there controls the (slower) vertical scanning operation, furnishes the synchronizing pulses which, at the receiver station, likewise control the (faster) vertical scanning operation. The (slower) horizontal scanning operation at the receiver station is controlled by pulses which are derived at the transmitter station, not from the (faster) horizontal scanning apparatus, but from the pulse generator 15 which controls the shutter and thus the exposure rate.

What is claimed is:

1. A narrow band image signal transmission system which comprises, at a transmitter station, an image signal generator having a photosensitive storage screen, means for periodically exposing said screen to said scene for a brief interval in each of a succession of periods, thereby to form on said screen a fixed image of said scene for each exposure, an image-scanning element, means including said element for developing an image signal related to the light value of a portion of said image, means for causing said scanning element repeatedly to scan said screen during each of said periods, traversing each of a plurality of line paths during each scan, means for briefly enabling said signal-developing means once during each such line path traverse to derive, for each exposure of the screen to the scene, a sequence of image signal samples, means for amplifying said image signal sample sequence, means for progressively increasing said amplification throughout the period between successive exposures of said screen to said scene, means for transmitting said image signal samples as a sample train to a receiver station, and, at said receiver station, means for reconverting an incoming sample train into a visible image.

2. A narrow band image signal transmission system which comprises, at a transmitter station, an image signal generator having a photosensitive storage screen, means for periodically exposing said screen to said scene for a brief interval in each of a succession of periods, thereby to form on said screen a fixed image of said scene for each exposure, an image scanning element, means including said element for developing an image signal related to the light value of a portion of said image, for causing said scanning element repeatedly to scan said screen during each of said periods, traversing each of a plurality of line paths during each scan, means for briefly enabling said signal-developing means once during each such line path traverse to derive, for each exposure of the screen to the scene, a sequence of image signal samples, means for transmitting said image signal samples as a sample train to a receiver station, and, at said receiver station, means for reconverting an incoming sample train into a visible image, and means for erasing the visible image reconstituted from each exposure immediately prior to the reconstitution of an image from the next exposure.

3. In a narrow band image signal transmission system, the combination which comprises an image signal generator having a photosensitive charge storage screen characterized by charge decay, means for projecting an electron beam onto said screen and beam deflecting means, means operative for a single brief interval in each of a succession of periods T for exposing said screen to a scene, thereby to form a substantially fixed charge image of said scene on said screen, said image being composed of a rectangular array of image elements arranged in $h$ vertically contiguous horizontal lines, each containing $w$ horizontally contiguous elements, means including said deflecting means for causing said beam rapidly to scan said entire screen in a period $$\frac{T}{n}$$

horizontally traversing all of the lines in sequence in the course of each such scan, and for causing said beam to repeat said scan $n$ times in each period T, means operative in all but the last one of said scans for briefly enabling said beam for a single instant, once during each line scan, to derive from said charge image a signal sample approximately representative of the light value of a single image element, whereby image elements thus sampled are vertically contiguous on said screen, means for gradually shifting the phases of said instants of enablement, throughout said period T, to cause the vertical row of contiguous image elements thus sampled to creep from one side of said screen to the other, occupying $n-1$ of said complete scan repetitions for said creep, whereby the residual charge image elements, after all have been sampled, are of various magnitudes, in dependence on the light values of the corresponding elements of the scene and on their sampling instants, and means, operative through the last one of said $n$ scan repetitions and immediately prior to the next exposure of said screen to said scene, for enabling said beam to charge all areas of said screen uniformly, thereby to erase all of said residual charge image elements and to prepare said screen for the formation of the next charge image by the next exposure.

4. In a narrow band image signal transmission system, the combination which comprises an image signal generator having a photosensitive charge storage screen characterized by charge decay, means for projecting an electron beam onto said screen and beam deflecting means, means operative for a single brief interval in each of a succession of periods T for exposing said screen to a scene, thereby to form a substantially fixed charge image of said scene on said screen, said image being composed of a rectangular array of image elements arranged in $h$ vertically contiguous horizontal lines, each containing $w$ horizontally contiguous elements, means including said deflecting means for causing said beam rapidly to scan said entire screen in a period $$\frac{T}{n}$$

horizontally traversing all of the lines in sequence in the course of each such scan, and for causing said beam to repeat said scan $n$ times in each period T, means operative in all but the last one of said scans for briefly enabling said beam for a single instant, once during each line scan, to derive from said charge image a signal sample approximately representative of the light value of a single image element, whereby image elements thus sampled are vertically contiguous on said screen, means for gradually shifting the phases of said instants of enablement, throughout said period T, to cause the vertical row of contiguous image elements thus sampled to creep from one side of said screen to the other, occupying $n-1$ of said complete scan repetitions for said creep, whereby signal samples derived from charge image elements representative of equal light values in said scene and located at widely different portions of said screen are of different amplitudes by reason of their differential charge decay over the period T, means for amplifying the train of said signal samples, and means for progressively increasing said amplification throughout said period T to compensate for said amplitude differences.

5. In a narrow band image signal transmission system, the combination which comprises an image signal generator having a photosensitive charge storage screen, means for projecting an electron beam onto said screen and beam deflecting means, means operative for a single brief interval in each of a succession of periods T for exposing said screen to a scene, thereby to form a substantially fixed charge image of said scene on said screen, said image being composed of a rectangular array of image elements arranged in $h$ vertically contiguous horizontal lines, each containing $w$ horizontally contiguous elements, means including said deflecting means for causing said beam rapidly to scan said entire screen in a period $$\frac{T}{n}$$

horizontally traversing all of the lines in sequence in the course of each such scan, and for causing said beam to repeat said scan $n$ times in each period T, the horizontal scanning rate being thus $$\frac{hn}{T}$$

and the vertical scanning rate being thus $$\frac{n}{T}$$

means operative in all but the last one of said scans for briefly enabling said beam for a single instant, once during each line scan, to derive from said charge image a signal sample approximately representative of the light value of a single image element, whereby image elements thus sampled are vertically contiguous on said screen, means for gradually shifting the phases of said instants of enablement, throughout said period T, to cause the vertical row of contiguous image elements thus sampled to creep from one side of said screen to the other, occupying $n-1$ of said complete scan repetitions for said creep, means for transmitting the train of signal samples to a receiver station, and, at said receiver station, image reconstituting means which comprises an image reproducer having an electrosensitive luminescent screen, means for projecting an electron beam onto said electrosensitive screen and beam deflecting means, means including said last-named deflecting means for causing said last-named beam completely to scan said electrosensitive screen, once for each exposure of said scene and throughout said period T, traversing each of a plurality of contiguous vertical line paths in the course of each scan at a relatively low speed, the vertical scanning rate being thus $$\frac{n}{T}$$

and the horizontal scanning rate being thus $$\frac{1}{T}$$

means for modulating said last-named beam by said signal sample train, thereby to apply in each vertical line scan, successive charges to points of said electrosensitive screen that are vertically contiguous to each other and so to build up on said electrosensitive screen a charge image counterpart of said scene, and means for converting said charge image counterpart into a visible image.

6. In a narrow band image signal transmission system, the combination which comprises an image signal generator having a photosensitive charge storage screen, means for exposing said screen to a scene, thereby to develop on said screen a fixed charge image of said scene, said image being composed of a rectangular array of image elements arranged in $h$ vertically contiguous horizontal lines, each containing $w$ horizontally contiguous elements, means for projecting an electron beam onto said screen and beam deflecting means, means including said deflecting means for causing said beam rapidly to scan said entire screen in a scan period $$\frac{T}{n}$$

horizontally traversing all of the lines in the course of each full scan of said entire screen and for causing said beam to repeat said scan $n$ times in each of a succession of periods T, the horizontal scanning rate being thus $$\frac{hn}{T}$$

and the frame scanning rate being thus $$\frac{n}{T}$$

means operative in all but the last one of said scans for briefly deriving, during a single instant, once during each line scan, from said charge image, a signal sample approximately representative of the light value of a single image element, whereby image elements thus sampled are vertically contiguous on said screen, means for gradually shifting the phases of said instants of enablement, throughout said period T, to cause the vertical row of contiguous image elements thus sampled to creep from one side of said screen to the other, occupying $n-1$ of said complete scan repetitions for said creep, means for transmitting the train of signal samples to a receiver station, and at said receiver station, image reconstituting means which comprises an image reproducer having an electrosensitive luminescent screen, means for projecting an electron beam onto said electrosensitive screen and beam deflecting means, means including said last-named deflecting means for causing said last-named beam completely to scan said electrosensitive screen, once for and throughout each period T, traversing each of a plurality of contiguous vertical line paths in the course of each scan at a relatively low speed, the vertical scanning rate being thus $$\frac{n}{T}$$

and the horizontal scanning rate being thus $$\frac{1}{T}$$

means for modulating said last-named beam by said signal sample train, thereby to apply, in each vertical line scan, successive charges to points of said electrosensitive screen that are vertically contiguous to each other and so to build up on said electrosensitive screen a charge image counterpart of said scene, and means for converting said charge image counterpart into a visible image.

References Cited in the file of this patent

UNITED STATES PATENTS

| | | |
|---|---|---|
| 2,017,883 | Zworykin | Oct. 22, 1935 |
| 2,275,898 | Goldsmith | Mar. 10, 1942 |
| 2,398,642 | Homrighous | Apr. 16, 1946 |
| 2,420,198 | Rosenthal | May 6, 1947 |
| 2,479,880 | Toulon | Aug. 23, 1949 |
| 2,537,173 | Szegho | Jan. 9, 1951 |
| 2,757,234 | Duvoisin | July 31, 1956 |
| 2,796,801 | Simjian | June 25, 1957 |
| 2,798,116 | Wiens | July 2, 1957 |

FOREIGN PATENTS

| | | |
|---|---|---|
| 906,982 | France | June 4, 1945 |